(No Model.)
T. SCHEIBEL.
GATE.
No. 461,986. Patented Oct. 27, 1891.
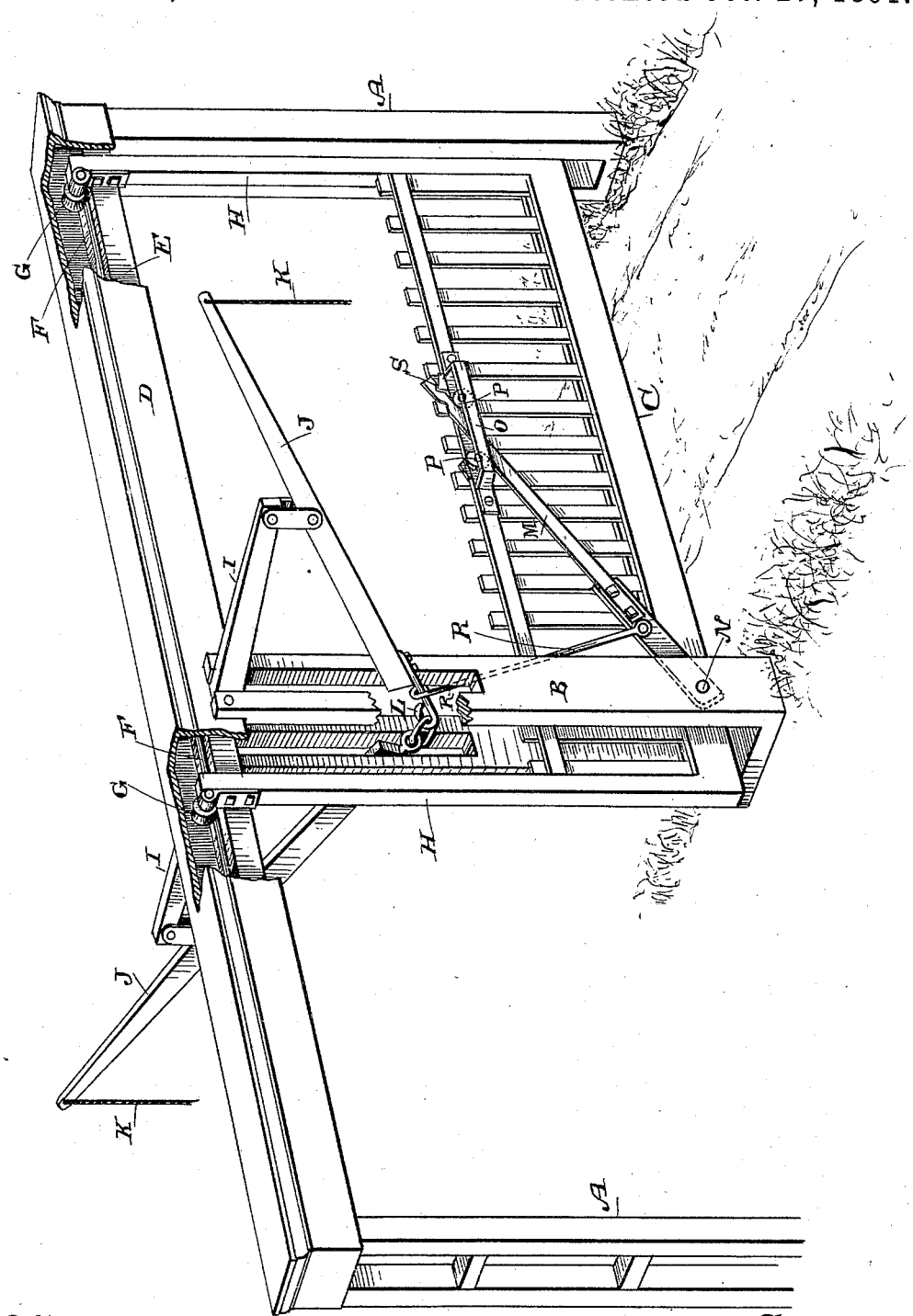
Witnesses,
J. H. Morse
J. A. Bayless
Inventor,
Theobald Scheibel
By Dewey & Co.
Att.

UNITED STATES PATENT OFFICE.

THEOBALD SCHEIBEL, OF SANTA ROSA, CALIFORNIA.

GATE.

SPECIFICATION forming part of Letters Patent No. 461,986, dated October 27, 1891.

Application filed April 27, 1891. Serial No. 390,667. (No model.)

*To all whom it may concern:*

Be it known that I, THEOBALD SCHEIBEL, a citizen of the United States, residing at Santa Rosa, Sonoma county, State of California, have invented an Improvement in Gates; and I hereby declare the following to be a full, clear, and exact description of the same.

My invention relates to certain improvements in gates; and it consists of the construction and combination of devices which I shall hereinafter fully describe and claim.

The figure is a perspective view of my gate with parts broken away.

A A are the end posts or stops, and B is a double post fixed midway between these two end posts, having the space between the two parts sufficiently wide to allow the gate C to travel backward and forward through this space, the ends of the gate abutting when it stops against either of the posts A. An antifrictional wheel is journaled in one or both of the guide-posts, against which the gate travels when forced to one side by the pressure of the wind or from other causes. These posts A and B are all continued up to a sufficient height above the gate to allow of the passage of any vehicle, and the tops of the posts are connected by an inclosed box or casing D. Within this casing is a horizontal beam E, having a rail F, fixed upon the top, upon which the grooved pulleys G are fitted to travel. The shafts of these pulleys are fixed to the upper ends of the timbers H, which are continued upwardly at each end of the gate to a sufficient height for the purpose, and by this construction the gate is suspended from above, the rollers traveling freely upon the rails, so that the gate may be pushed to one end of its travel, leaving the space of the roadway open for the passage of vehicles, and when pushed to the other end of its travel it is closed.

I I are two extensions from the sides of the post B in a plane at right angles with the plane of the travel of the gate. On these extensions are fulcrumed the levers J, having at their outer ends ropes or cords K, by which they may be pulled downward by any traveler approaching the gate without dismounting from the horse or vehicle. The inner ends of these levers are quite close together, and are connected by a loose link or jointed device L, which has sufficient play to allow the inner ends of the levers to move in the arc of a circle, which they will describe when raised or lowered about their fulcrum-points.

M is a rod or bar having one end fulcrumed at N between the two sides of the guide-post B and at one side of the line of travel of the gate.

Midway of the top of the gate is fixed a plate O, between which and the side of the gate the outer free end of the bar M extends. Rollers P are journaled between this plate and the side of the gate, standing upon each side of the bar M and serving to reduce the friction of its movement as the gate is operated.

R is a rod or bar having one end pivoted to the bar M at some suitable point between its fulcrum N and its outer end. The other end of the bar R is connected with the inner end of the joint L of the levers J.

The operation will then be as follows: When the outer end of one of the levers J is pulled downward, it acts through the rod R to pull the lever M up toward a central position, and in doing this it slides through the space within the plate O and between the rollers P, and the resultant upon the gate of this angular motion causes the gate to travel horizontally from the position which it occupies at the time (either open or closed) toward the opposite end of its travel, the gate being suspended and running easily upon the rollers G, as before described. When the bar M has reached a vertical position, the momentum of the gate will carry it past the center, and its weight is such that when the pull upon the cord K is released the lever M will act to press the gate onward, in case the momentum given it by the pull is not sufficient, and will thus continue its motion and carry it on to the end of its travel. The weight of this lever M is sufficient ordinarily to retain the gate at either end of its travel; but in order to prevent the gate from rebounding after it strikes either post A, I form latches or notches S in the bar M and fix corresponding catches upon the top of the gate just above the plate O, through which the bar M travels, in such a position that when the gate has reached the end of its travel the notch will engage with the catch on the gate, and thus prevent the gate rebounding, or opening, or being easily opened by animals. It will be manifest that as soon as there is a pull upon either of the levers J the bar will be lifted, so as to disengage it from its locking-catch, and during the pull the top of the bar will travel against the roller P, which is above it. After passing the center the bar M will rest upon the roller P, which is then beneath it, and will continue to press upon that roller until just as the gate closes, when the angle of the lever will have become such that it will be disengaged from the roller, and the notch will engage with the catch on the gate.

Having thus described my invention, what I claim as new, and desire to secure by Letters Patent, is—

The combination of the gate, the operating hand-levers, the bar M, fulcrumed at one end and having the opposite end provided with notches or catches, latches upon the gate adapted to be engaged by said notches or catches, a guide on said gate having anti-friction rollers near its ends, between which the free end of the bar M passes, and a connection between the operating hand-levers and said bar, substantially as herein described.

In witness whereof I have hereunto set my hand.

THEOBALD SCHEIBEL.

Witnesses:
S. H. NOURSE,
J. A. BAYLESS.